US008677055B2

(12) United States Patent
Ouye et al.

(10) Patent No.: US 8,677,055 B2
(45) Date of Patent: Mar. 18, 2014

(54) FLEXIBLE WAY OF SPECIFYING STORAGE ATTRIBUTES IN A FLASH MEMORY-BASED OBJECT STORE

(75) Inventors: Darryl Ouye, Aptos, CA (US); Darpan Dinker, Union City, CA (US); John Busch, Cupertino, CA (US)

(73) Assignee: Sandisk Enterprises IP LLC, Milpitas, CA (US)

( * ) Notice: Subject to any disclaimer, the term of this patent is extended or adjusted under 35 U.S.C. 154(b) by 305 days.

(21) Appl. No.: 12/983,758

(22) Filed: Jan. 3, 2011

(65) Prior Publication Data

US 2011/0252181 A1    Oct. 13, 2011

Related U.S. Application Data

(60) Provisional application No. 61/323,351, filed on Apr. 12, 2010.

(51) Int. Cl.
*G06F 12/00* (2006.01)

(52) U.S. Cl.
USPC .......................................................... 711/103

(58) Field of Classification Search
None
See application file for complete search history.

(56) References Cited

U.S. PATENT DOCUMENTS

| | | | |
|---|---|---|---|
| 4,916,605 A | 4/1990 | Beardsley et al. |
| 5,046,002 A | 9/1991 | Takashi et al. |
| 5,057,996 A | 10/1991 | Cutler et al. |
| 5,117,350 A | 5/1992 | Parrish et al. |
| 5,212,789 A | 5/1993 | Rago |
| 5,287,496 A | 2/1994 | Chen et al. |
| 5,297,258 A | 3/1994 | Hale et al. |
| 5,394,555 A | 2/1995 | Hunter et al. |
| 5,403,639 A | 4/1995 | Belsan et al. |
| 5,423,037 A | 6/1995 | Hvasshovd |
| 5,509,134 A | 4/1996 | Fandrich et al. |
| 5,537,534 A | 7/1996 | Voigt et al. |
| 5,603,001 A | 2/1997 | Sukegawa et al. |
| 5,611,057 A | 3/1997 | Pecone et al. |
| 5,613,071 A | 3/1997 | Rankin et al. |
| 5,680,579 A | 10/1997 | Young et al. |
| 5,692,149 A | 11/1997 | Lee |

(Continued)

FOREIGN PATENT DOCUMENTS

| | | |
|---|---|---|
| EP | 1548600 B1 | 1/2007 |
| EP | 1746510 A1 | 1/2007 |

OTHER PUBLICATIONS

Bsn-modulestore, Versioning Concept, Oct. 13, 2010, 2 pgs.
Btrfs, http://en.wikipedia.org, Oct. 3, 2011, 9 pgs.

(Continued)

*Primary Examiner* — Hiep Nguyen
(74) *Attorney, Agent, or Firm* — Morgan, Lewis & Bockius LLP

(57) ABSTRACT

Approaches for performing a write operation on a solid state device (SSD). One or more containers are maintained on the solid state device. Each container is a logical grouping of objects independent from where the logical grouping of objects are physically stored on the solid state device. When a write operation is received at the SSD, the manner is which changes requested by the write operation should be stored are determined based on which container is being written. Containers provide a flexible approach for specifying attributes of how data should be stored and accessed which is independent from where the data is physically stored. Containers also have particular utility in performing load balancing and ensuring high availability and recovery.

20 Claims, 5 Drawing Sheets

(56) References Cited

U.S. PATENT DOCUMENTS

| | | | |
|---|---|---|---|
| 5,701,480 A | 12/1997 | Raz | |
| 5,742,787 A | 4/1998 | Talreja | |
| 5,887,138 A | 3/1999 | Hagersten et al. | |
| 5,897,661 A | 4/1999 | Baranovsky et al. | |
| 5,897,664 A | 4/1999 | Nesheim et al. | |
| 5,963,983 A | 10/1999 | Sakakura et al. | |
| 6,000,006 A | 12/1999 | Bruce et al. | |
| 6,052,815 A | 4/2000 | Zook | |
| 6,130,759 A | 10/2000 | Blair | |
| 6,141,692 A | 10/2000 | Loewenstein et al. | |
| 6,216,126 B1 | 4/2001 | Ronstrom | |
| 6,298,390 B1 | 10/2001 | Matena et al. | |
| 6,308,169 B1 | 10/2001 | Ronstrom et al. | |
| 6,434,144 B1 | 8/2002 | Romanov | |
| 6,467,060 B1 | 10/2002 | Malakapalli et al. | |
| 6,615,313 B2 | 9/2003 | Kato et al. | |
| 6,658,526 B2 | 12/2003 | Nguyen et al. | |
| 6,728,826 B2 | 4/2004 | Kaki et al. | |
| 6,745,209 B2 | 6/2004 | Holenstein et al. | |
| 6,874,044 B1 | 3/2005 | Chou et al. | |
| 6,938,084 B2 | 8/2005 | Gamache et al. | |
| 6,981,070 B1 | 12/2005 | Luk et al. | |
| 7,003,586 B1 | 2/2006 | Bailey et al. | |
| 7,010,521 B2 | 3/2006 | Hinshaw et al. | |
| 7,043,621 B2 | 5/2006 | Merchant et al. | |
| 7,082,481 B2 | 7/2006 | Lambrache et al. | |
| 7,162,467 B2 | 1/2007 | Eshleman et al. | |
| 7,200,718 B2 | 4/2007 | Duzett | |
| 7,203,890 B1 | 4/2007 | Normoyle | |
| 7,249,280 B2 | 7/2007 | Lamport et al. | |
| 7,269,708 B2 | 9/2007 | Ware | |
| 7,269,755 B2 | 9/2007 | Moshayedi et al. | |
| 7,272,605 B1 | 9/2007 | Hinshaw et al. | |
| 7,272,654 B1 | 9/2007 | Brendel | |
| 7,281,160 B2 | 10/2007 | Stewart | |
| 7,305,386 B2 | 12/2007 | Hinshaw et al. | |
| 7,334,154 B2 | 2/2008 | Lorch et al. | |
| 7,359,927 B1 | 4/2008 | Cardente | |
| 7,383,290 B2 | 6/2008 | Mehra et al. | |
| 7,406,487 B1 | 7/2008 | Gupta et al. | |
| 7,417,992 B2 | 8/2008 | Krishnan | |
| 7,467,265 B1 | 12/2008 | Tawri et al. | |
| 7,529,882 B2 * | 5/2009 | Wong | 711/103 |
| 7,542,968 B2 | 6/2009 | Yokomizo et al. | |
| 7,562,162 B2 | 7/2009 | Kreiner et al. | |
| 7,584,222 B1 | 9/2009 | Georgiev | |
| 7,610,445 B1 | 10/2009 | Manus et al. | |
| 7,647,449 B1 | 1/2010 | Roy et al. | |
| 7,809,691 B1 | 10/2010 | Karmarkar et al. | |
| 7,822,711 B1 | 10/2010 | Ranade | |
| 7,885,923 B1 | 2/2011 | Tawri et al. | |
| 7,917,472 B2 * | 3/2011 | Persson | 707/640 |
| 8,015,352 B2 | 9/2011 | Zhang et al. | |
| 8,018,729 B2 | 9/2011 | Skinner | |
| 8,024,515 B2 | 9/2011 | Auerbach et al. | |
| 8,037,349 B2 | 10/2011 | Mandagere et al. | |
| 8,069,328 B2 | 11/2011 | Pyeon | |
| 8,239,617 B1 | 8/2012 | Linnell | |
| 8,261,289 B2 | 9/2012 | Kasravi et al. | |
| 8,321,450 B2 | 11/2012 | Thatte et al. | |
| 8,335,776 B2 | 12/2012 | Gokhale | |
| 8,370,853 B2 | 2/2013 | Giampaolo et al. | |
| 8,401,994 B2 | 3/2013 | Hoang et al. | |
| 2002/0166031 A1 | 11/2002 | Chen et al. | |
| 2002/0184239 A1 | 12/2002 | Mosher, Jr. et al. | |
| 2003/0016596 A1 | 1/2003 | Chiquoine et al. | |
| 2003/0097610 A1 | 5/2003 | Hofner | |
| 2003/0177408 A1 | 9/2003 | Fields et al. | |
| 2003/0220985 A1 | 11/2003 | Kawamoto et al. | |
| 2004/0010502 A1 | 1/2004 | Bomfim et al. | |
| 2004/0078379 A1 | 4/2004 | Hinshaw et al. | |
| 2004/0143562 A1 | 7/2004 | Chen et al. | |
| 2004/0148283 A1 | 7/2004 | Harris et al. | |
| 2004/0172494 A1 | 9/2004 | Pettey et al. | |
| 2004/0205151 A1 | 10/2004 | Sprigg et al. | |
| 2004/0230862 A1 | 11/2004 | Merchant et al. | |
| 2004/0267835 A1 | 12/2004 | Zwilling et al. | |
| 2005/0005074 A1 | 1/2005 | Landin et al. | |
| 2005/0021565 A1 | 1/2005 | Kapoor et al. | |
| 2005/0027701 A1 | 2/2005 | Zane et al. | |
| 2005/0028134 A1 | 2/2005 | Zane et al. | |
| 2005/0034048 A1 | 2/2005 | Nemawarkar et al. | |
| 2005/0081091 A1 | 4/2005 | Bartfai et al. | |
| 2005/0086413 A1 | 4/2005 | Lee et al. | |
| 2005/0120133 A1 | 6/2005 | Slack-Smith | |
| 2005/0131964 A1 | 6/2005 | Saxena | |
| 2005/0240635 A1 | 10/2005 | Kapoor et al. | |
| 2005/0246487 A1 | 11/2005 | Ergan et al. | |
| 2006/0059428 A1 * | 3/2006 | Humphries et al. | 715/734 |
| 2006/0161530 A1 | 7/2006 | Biswal et al. | |
| 2006/0174063 A1 | 8/2006 | Soules et al. | |
| 2006/0174069 A1 | 8/2006 | Shaw et al. | |
| 2006/0179083 A1 | 8/2006 | Kulkarni et al. | |
| 2006/0195648 A1 | 8/2006 | Chandrasekaran et al. | |
| 2006/0212795 A1 | 9/2006 | Cottrille et al. | |
| 2006/0218210 A1 | 9/2006 | Sarma et al. | |
| 2006/0242163 A1 | 10/2006 | Miller et al. | |
| 2006/0253724 A1 | 11/2006 | Zhang | |
| 2007/0043790 A1 | 2/2007 | Kryger | |
| 2007/0143368 A1 | 6/2007 | Lundsgaard et al. | |
| 2007/0174541 A1 | 7/2007 | Chandrasekaran et al. | |
| 2007/0234182 A1 | 10/2007 | Wickeraad et al. | |
| 2007/0276784 A1 | 11/2007 | Piedmonte | |
| 2007/0283079 A1 | 12/2007 | Iwamura et al. | |
| 2007/0288692 A1 | 12/2007 | Bruce et al. | |
| 2007/0288792 A1 | 12/2007 | Thorpe et al. | |
| 2007/0294564 A1 | 12/2007 | Reddin et al. | |
| 2007/0299816 A1 | 12/2007 | Arora et al. | |
| 2008/0034076 A1 | 2/2008 | Ishikawa et al. | |
| 2008/0034174 A1 | 2/2008 | Traister et al. | |
| 2008/0034249 A1 | 2/2008 | Husain et al. | |
| 2008/0046538 A1 | 2/2008 | Susarla et al. | |
| 2008/0046638 A1 | 2/2008 | Maheshwari et al. | |
| 2008/0126706 A1 | 5/2008 | Newport et al. | |
| 2008/0288713 A1 | 11/2008 | Lee et al. | |
| 2009/0006500 A1 | 1/2009 | Shiozawa et al. | |
| 2009/0006681 A1 | 1/2009 | Hubert et al. | |
| 2009/0006888 A1 | 1/2009 | Bernhard et al. | |
| 2009/0019456 A1 | 1/2009 | Saxena et al. | |
| 2009/0024871 A1 | 1/2009 | Emaru et al. | |
| 2009/0030943 A1 | 1/2009 | Kall | |
| 2009/0070530 A1 | 3/2009 | Satoyama et al. | |
| 2009/0150599 A1 | 6/2009 | Bennett | |
| 2009/0177666 A1 | 7/2009 | Kaneda | |
| 2010/0125695 A1 | 5/2010 | Wu et al. | |
| 2010/0241895 A1 | 9/2010 | Li et al. | |
| 2010/0262762 A1 | 10/2010 | Borchers et al. | |
| 2010/0318821 A1 | 12/2010 | Kwan et al. | |
| 2011/0022566 A1 | 1/2011 | Beaverson et al. | |
| 2011/0082985 A1 | 4/2011 | Haines et al. | |
| 2011/0099420 A1 | 4/2011 | MacDonald McAlister | |
| 2011/0167038 A1 | 7/2011 | Wang et al. | |
| 2011/0179279 A1 * | 7/2011 | Greevenbosch et al. | 713/176 |
| 2011/0185147 A1 | 7/2011 | Hatfield et al. | |

OTHER PUBLICATIONS

Buchholz, The Structure of the Reiser File System, Jan. 26, 2006, 21 pgs.
Chacon, Git, The Fast Version Control System, Oct. 3, 2011, 3 pgs.
Email Communication from James Bodwin to Christopher Brokaw re prior art, Sep. 13, 2011, 4 pgs.
Git (Software), http://en.wikipedia.org, Oct. 3, 2011, 10 pgs.
Hitz, File System Design for an NFS File Server Appliance, Jan. 19, 1994, 23 pgs.
McDonald, Architectural Semantics for Practical Transactional Memory, Jun. 2006, 12 pgs.
McGonigle, A Short History of btrfs, Aug. 14, 2009, 11 pgs.
Mellor, ZFS—the future of file systems? Aug. 14, 2006, 5 pgs.
Mercurial, http://en.wikipedia.org, Oct. 2, 2011, 6 pages.
Module: Mongoid: Versioning, http://rdoc.info, Documentation by YARD 0.7.2, 6 pages Oct. 3, 2011.
Noach, Database Schema under Version Control, code.openarck.org, Apr. 22, 2010, 6 pages.

(56) References Cited

OTHER PUBLICATIONS

Reiser FS, , http://enwikipedia.org, Sep. 17, 2011, 5 pgs.
RICE, Extension Versioning, Update and Compatibility, Aug. 9, 2011, 11 pgs.
RICE, Toolkit Version Format, Aug. 19, 2011, 4 pgs.
Russell, Track and Record Database Schema Versions, Jun. 28, 2005, 8 pgs.
Schooner Information Technology, IPAF, PCT/US2008/065167, Oct. 23, 2008, 7 pgs.
Schooner Information Technology, ISR/WO, PCT/US2008/065167, Jan. 28, 2009, 16 pgs.
SQL Server Database Schema Versioning and Update, Dec. 2, 2009, 2 pgs.
Sufficiently Advanced Bug, File Versioning, Caching and Hashing, Oct. 3, 2011, 3 pgs.
The Z File System (ZFS), FreeBSD Handbook, Oct. 3, 2011, 8 pgs (Author not provided).
Tux3 Linux Filesystem Project, 2008, 1 pg.
Tux3 Versioning Filesystem, Jul. 2008, 67 pgs.
Tux3, http://en.wikipedia.org, Jun. 2, 2010, 3 pgs.
Vijaykumar, Speculative Versioning Cache, Dec. 1, 2001, 13 pgs.
WAFL—Write Anywhere File Layout, 1999, 1 pg.
Write Anywhere File Layout, Sep. 9, 2011, 2 pgs.
ZFS, , http://en.wikipedia.org Sep. 30, 2011, 18 pgs.
Ajmani, Automatic Software Upgrades for Distributed Systems, MIT, Sep. 2004, 164 pgs.
Amza, Data Replication Strategies for Fault Tolerance and Availability on Commodity Clusters, 2000, 9 pgs.

\* cited by examiner

PRIOR APPROACH

APPROACH OF AN EMBODIMENT

US 8,677,055 B2

FLEXIBLE WAY OF SPECIFYING STORAGE ATTRIBUTES IN A FLASH MEMORY-BASED OBJECT STORE

RELATED APPLICATION DATA

This application claims priority to U.S. provisional patent application No. 61/323,351, entitled "Distributed Data Access Using Solid State Storage," filed Apr. 12, 2010, invented by John Richard Busch et al., the entire contents of which are incorporated by reference for all purposes as if fully set forth herein.

This application is related to U.S. non-provisional patent application No. 12/983,754, entitled "Efficient Flash Memory-Based Object Store," filed the same day as herewith, invented by John Busch et al., the entire contents of which are incorporated by reference for all purposes as if fully set forth herein.

This application is related to U.S. Non-provisional patent application No. 12/983,762, entitled "Minimizing Write Operations to a Flash Memory-Based Object Store," filed the same day as herewith, invented by Darpan Dinker, the entire contents of which are incorporated by reference for all purposes as if fully set forth herein.

This application is related to U.S. provisional patent application No. 61/359,237, entitled "Approaches for Replication in a Distributed Transaction System Employing Solid State Devices," filed Jun. 28, 2010, invented by John Busch et al., the entire contents of which are incorporated by reference for all purposes as if fully set forth herein.

FIELD OF THE INVENTION

The present invention generally relates to an object store implemented, at least in part, on one or more solid state devices.

BACKGROUND

With the explosive growth in the number and complexity of Web 2.0 applications, software-as-a-service (SaaS), cloud computing, and other enterprise applications, datacenter workloads have increased dramatically. The business opportunities created by these new applications are substantial, but the demands they place on the datacenter are daunting.

The success of modern web sites and other enterprise applications depends heavily on the ability to effectively scale both the data tier and the caching tier on which these applications depend. Unfortunately, ordinary server, database, data store, and caching infrastructures are loosely integrated and minimally optimized. As a result, existing datacenter solutions do not adequately address the performance, capacity, scaling, reliability, and power challenges of supporting dynamic online data and services effectively.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for implementing an object store, at least in part, on one or more solid state devices are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Architecture Overview

Embodiments of the invention enable a variety of different types of object stores to be implemented on one or more solid state devices (SSD), such as flash memory. For example, embodiments of the invention enable object stores, such as a memcached caching system, a MySQL database, or a key-value data store, to store data on one or more solid state devices. Advantageously, the architecture of embodiments is specifically tailored for using solid state devices in a fast, efficient, and scalable manner to obtain better performance than prior approaches.

Figure 1:
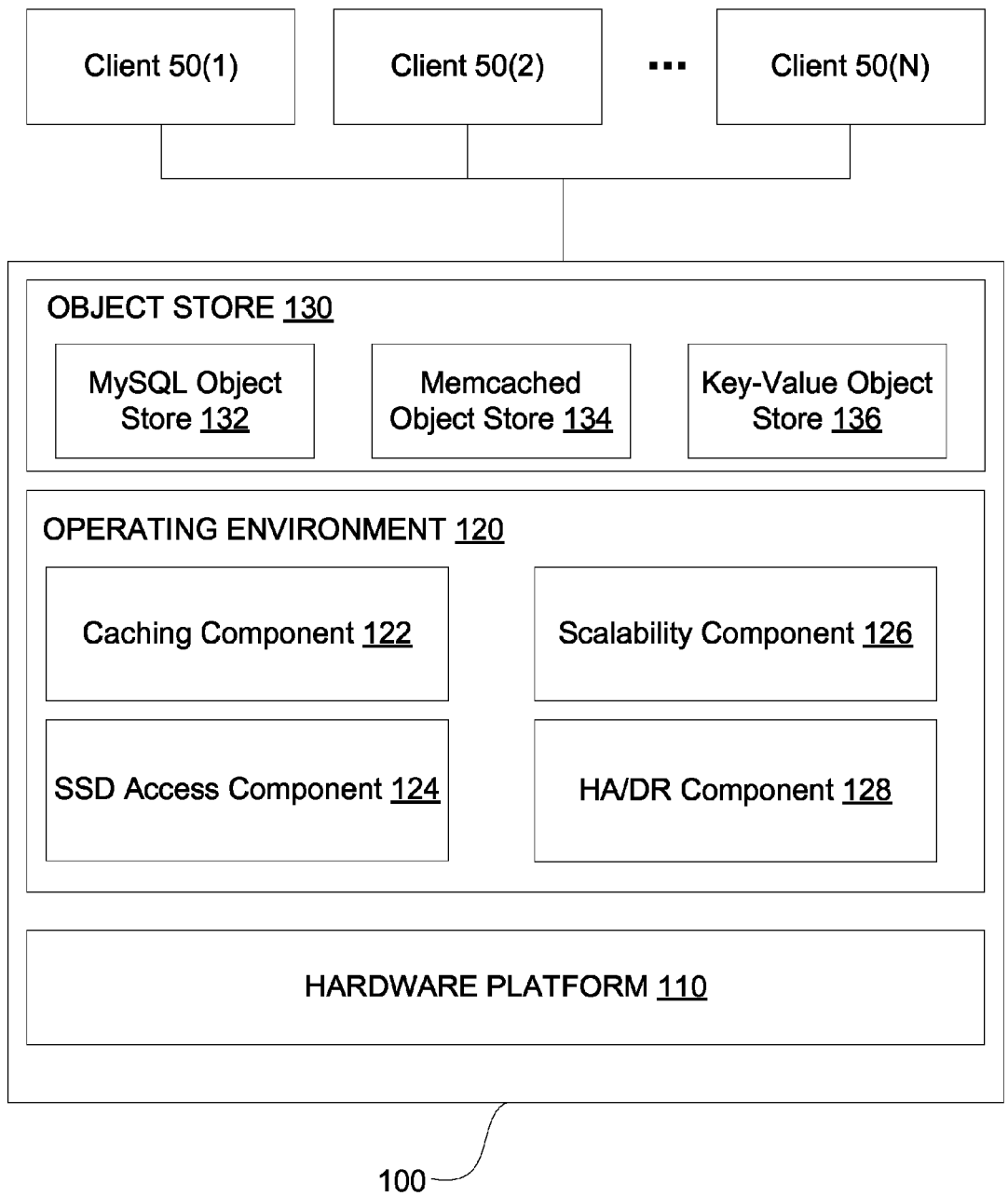
FIG. 1 is a block diagram of an illustrative system for implementing an object store, at least in part, on one or more solid state devices according to one embodiment of the invention.

FIG. 1 is a block diagram of device 100 for implementing an object store, at least in part, on one or more solid state devices according to one embodiment of the invention. In an embodiment, device 100 comprises hardware platform 110, operating environment 120, and object store 130. A commercial example of device 100 is the Schooner Appliance, available from Schooner Information Technology of Sunnyvale, Calif.

Device 100 may be used in a variety of contexts to efficiently manage large amounts of data. To illustrate the capabilities of device 100, consider FIG. 2A, which depicts a prior approach 210 in which one or more applications 212 communicate with a master database management system (DBMS) 216. In processing a request from one or more applications 212, Master DBMS 216 may issue a request for data to a pool of one or more slave DBMSs 214. To support a large number of applications 212, the total workload from the one or more applications 212 may be distributed or shared in some fashion among the one or more slave DBMSs 214. After one of the one or more slave DBMSs 214 retrieves requested data, that slave DBMS may forward the requested data to the requesting application 212.

In contrast, in the approach of embodiment 240, device 100 may perform the work of all of the one or more slave DBMSs 214. Thus, in the example of FIG. 2A, rather than deploying eight slave DBMSs, the approach of the embodiment uses a single device 100. Device 100 is able to respond quicker to requests originating from the one or more applications 212 than the slave DBMSs 214 in approach 210. Further, as a result of using one physical device rather than eight physical devices, less electricity is required, which is a substantial savings, both monetarily and in impact to the environment.

Figure 2A:
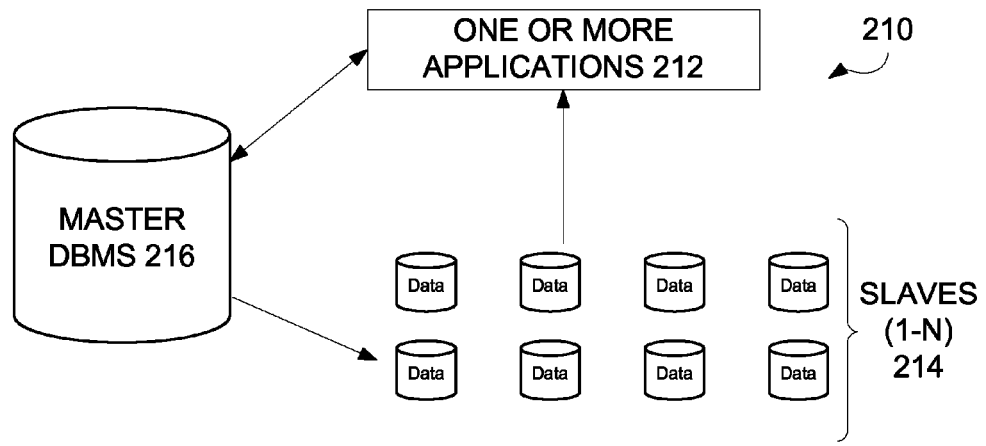
FIG. 2A is a block diagram of one example of how an object store according to one embodiment of the invention may be used.
Figure 2A:
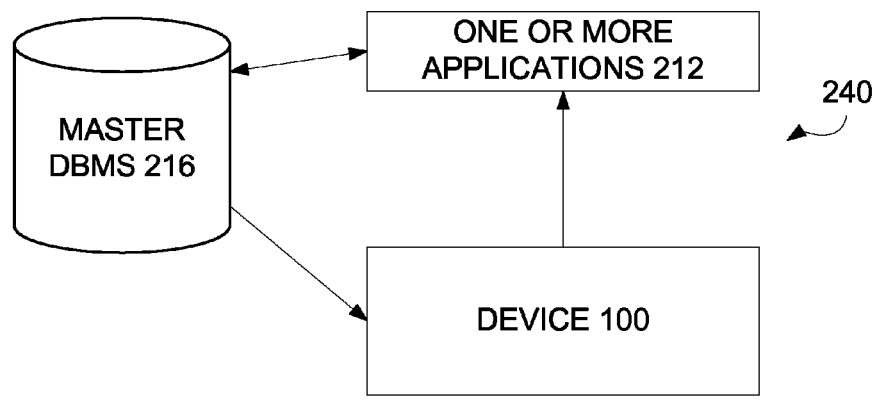
Figure 2B:
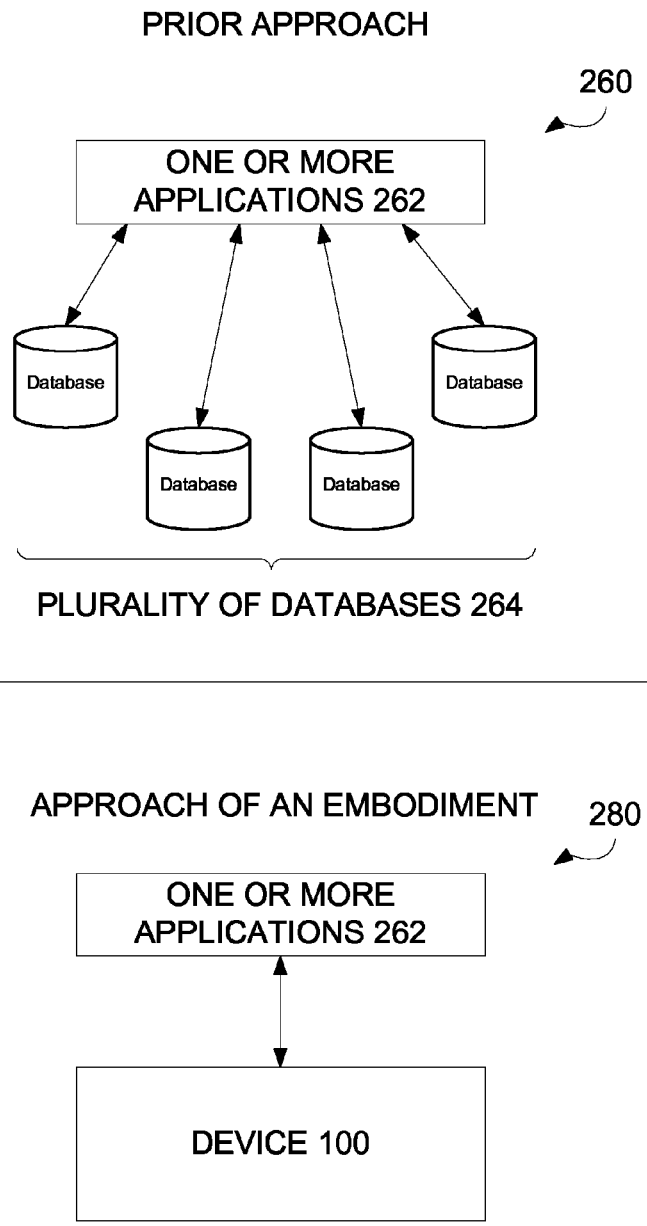
FIG. 2B is a block diagram of another example of how an object store according to one embodiment of the invention may be used.

FIG. 2B illustrates another example of how device 100 may be used. FIG. 2B depicts prior approach 260 in which one or more applications 262 communicate with a plurality of databases 264. As shown in the approach of embodiment 280, device 100 may perform the work of all of the plurality of databases 264 due to the ability of embodiments to manage large amounts of data in an object store in a fast and efficient manner. As in FIG. 2A, less electricity is required to power a single device 100 rather than all of the plurality of databases 264, which is a substantial savings, both monetarily and in impact to the environment. FIGS. 2A and 2B are not meant to depict or characterize the many ways in which device 100 may be arranged in a network to service clients or the type of data which device 100 may be used to store and manage, but rather, FIGS. 2A and 2B are meant to show how embodiments of the invention may perform work traditionally performed by a plurality of different devices.

Returning to FIG. 1, device 100 includes hardware platform 110, operating environment 120, and object store 130. Hardware platform 110 refers to the hardware components of device 100, e.g., hardware platform 110 includes one or more solid state devices. Hardware platform 110 will be described in greater detail below with reference to FIG. 3.

Operating environment 120 refers to software that is designed to support the operation of object store 130 on hardware platform 110. Operating environment 120 may be specifically tailored to operate efficiently on one or more solid state devices comprised within hardware 110. The embodiment of FIG. 1 depicts operating environment 120 as comprising four functional components, namely caching components 122, SSD access components 124, scalability components 126, and high availability/disaster recovery (HA/DR) components 128. The functions performed by operating environment 120 may be attributed to one of these four components in the following discussion; however, these components are merely illustrative, as other embodiments may implement the functions attributed to each of these components using a different arrangement of components. In practice, the functions attributed to these components need not be performed by a single software entity, but rather, the depiction of these components in FIG. 1 is meant to represent categories of related functions provided by the software comprising operating environment 130.

Caching component 122 refers to software components, within operating environment 120, which are responsible for performing caching services in a manner that is optimized or specifically tailored for solid state devices. Caching component 122 may support write-through and/or write-back caching.

SSD access component 124 refers to software components, within operating environment 120, which are responsible for enabling highly parallel read and write access to solid state devices. SSD access component 124 may be configured to minimize the wear of solid state devices and provide data durability with high performance. SSD access component 124 may provide redundant array of integrated disks (RAID) support.

Scalability component 126 refers to software components, within operating environment 120, which are responsible for ensuring that object store 130 may scale to support a large number of users. In certain embodiments, scalability component 126 may provide fine-grain locking, scalable and concurrent data structures, optimized thread-to-core allocation, and efficient handling of network interrupts.

HA/DR component 128 refers to software components, within operating environment 120, which are responsible for ensuring that object store 130 is highly available as well as for recovering object store 130. In an embodiment, HA/DR component 128 may perform synchronous and/or asynchronous replication of data within object store 130, perform failure detection of object store 130, automated virtual IP address (VIP) failover, perform incremental data recovery, and perform an incremental or full online backup and restore process.

As broadly used herein, object store 130 refers to software designed to store, either persistently or non-persistently, objects within an organized data store. Typically, object store 130 receives and processes requests from one or more of clients 50(1) to (N). In processing such requests, object store may store objects on or read objects from storage mediums within hardware platform 110, such as a solid state device.

Object store 130 may correspond to a variety of different types of mechanisms for storing data, such as a MySQL DBMS, a memcached object caching system, or any type of key-value data store for example. In certain embodiments, object store 130 may implement a NoSQL database while in other embodiments object store 130 may implement a traditional relational database.

In FIG. 1, for ease of explanation, object store 130 is depicted as comprising three different object stores, namely object stores 132, 134, and 136. In practice, each implementation of object store 130 may only support one type of data store, and so in practice object store 130 may only include one of object store 132, 134, and 136. However, in other embodiments of the invention, device 100 may be configured to store data by supporting a variety of different types of object store protocols, and thus object store 130 may include two or more of object stores 132, 134, and 136 to support such protocols.

MySQL object store 132 refers to a MySQL DBMS, memcached object store 134 refers to the memcached caching system, and key-value object store 136 refers to any type of key-value data store. Object store 130 may support a wide variety of different types of object stores, and so, object stores 132-136 are merely illustrative of several examples data stores of embodiments and are not intended to be a comprehensive list of all the types of data stores which may be implemented by object store 130.

Hardware Platform

Figure 3:
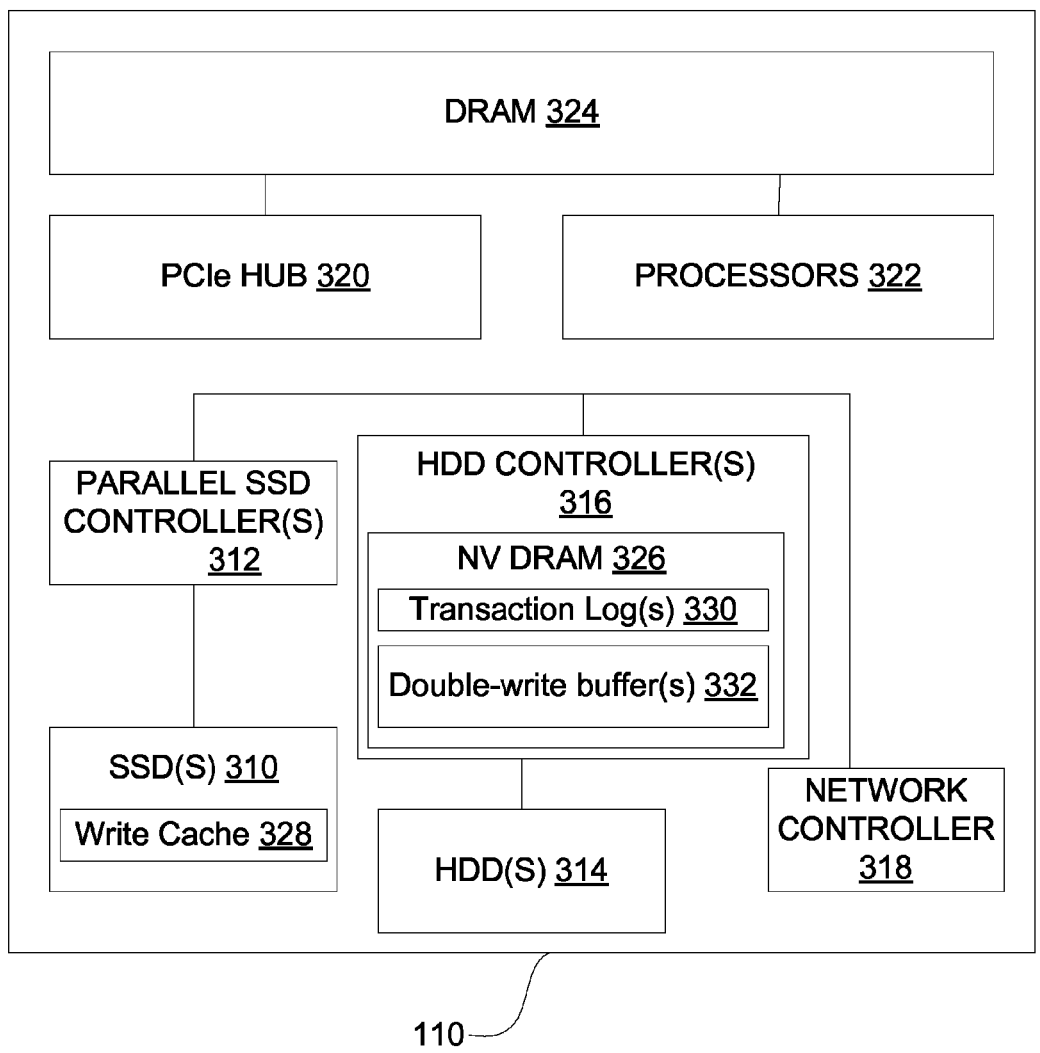
FIG. 3 is a block diagram of an illustrative hardware platform of an object store according to one embodiment of the invention.

FIG. 3 is a block diagram of hardware platform 110 of device 100 according to one embodiment of the invention. The particular hardware components shown in FIG. 3 are not meant to depict all the hardware components which may be comprised in hardware platform 110 nor are they meant to depict necessary or required components of hardware platform 110, as the hardware components shown in FIG. 3 are optional and are merely illustrative of an embodiment.

Hardware platform 110 may comprise one or more solid state devices (SSDs) 310 and one or more parallel SSD controller(s) 312. As broadly used herein, SSD(s) 310 may be implemented using any type of solid state device, although examples discussed herein shall be explained in the context of SSD(s) 310 being implemented using flash memory. Each SSD in SSD(s) 310 contains a write cache 328.

In an embodiment, hardware platform 110 may include one or more hard-disk drive(s) 314 and one or more HDD controller(s) 316. In an embodiment, each HDD controller in HDD controller(s) 316 may include a non-volatile (NV) DRAM 326. In an embodiment, NV DRAM 326 may store one or more of transaction log(s) 330 and one or more double-write buffer(s) 332 for object store 130.

NV DRAM 326 may be constructed using a DRAM which includes a battery so that if the power to the DRAM is disrupted, the battery will supply power to the DRAM, thereby ensuring that the data stored thereon may be persistently stored (at least until the battery runs out).

In an embodiment, hardware platform 110 also comprises network controller 318, PCIe HUB 320, one or more processors 322, and dynamic random access memory (DRAM) 324.

Moving Transaction Logs to Non Volatile Dram

Device 100, in maintaining object store 130, performs write operations to SSD(s) 310. It is desirable to minimize the number of write operations performed against SSD(s) 310 to minimize reorganization and defragment pauses, as some solid state devices may not allow the direct write of a block that requires physical block reorganization without a prior erase of the block, and instead, may leverage a different physical block size on the media compared to the written block size. Another motivation in minimizing the number of write operations performed on SSD(s) 310 is that doing so prolongs their service life, as some solid state devices (such as flash memory) only support a certain number of erase operations before they become unreliable.

Advantageously, when a solid state device in SSD(s) 310 is responsible for storing at least a portion of data in object store 130, embodiments of the invention enable transaction log(s) 330 (which contain transaction information for write operations performed against object store 130) to be maintained on a storage medium other than SSD(s) 310. For example, transaction log(s) 330 may be moved to NV DRAM 326 of HDD controller 316 as depicted in FIG. 3. Such an approach utilizes the strength of hard-disk drives, as they are relatively efficient at performing sequential read and write operations, and the updates to transaction log(s) 330 are performed using sequential write operations.

Thus, in an embodiment, in response to object store 130 receiving a request to commit a transaction, object store 130 sends a request to store transaction information, for the transaction made against object store 130, to SSD access component 124 within operating environment 120. SSD access component 124, in turn, writes the transaction information to NV DRAM 326. NV DRAM 326 may reside in any type of storage device other than a solid state device, e.g., NV DRAM 326 is depicted in FIG. 3 as residing in HDD controller 316, although embodiments may implement NV DRAM 326 in other locations. When object store 130 receives a response from SSD access component 124 indicating that the transaction information has been persistently stored in the transaction log(s) 330 stored on NV DRAM 326, object store 130 may send a response, to an interested party (such as a client 50(1)), indicating that the transaction, made against object store 130, has been committed. This approach ensures that any committed transaction may be recovered, even though dirty data blocks in the cache may not be persistently stored. This is so because the above approach ensures that transaction log(s) 330 are durably stored on NV DRAM 326.

Advantageously, using the best attributes of a HDD (sequential read and write operations) are used to offload work from SSD(s) 310, thereby providing the expedient performance of writing to transaction log(s) 330 and minimizing write operations to SSD(s) 310 to help extend the service life of SSD(s) 310. It is estimated by the inventors that by moving translation log(s) 330 off SSDs 310, the lifespan of SSD(s) 310 may be doubled as a result of the reduced number of write operations performed on SSD(s) 310.

Variable Block Size

The standard storage engine of MySQL object store uses a fixed 16 kB block size for all data files and indices. Unfortunately, it is observed that this block size has the following disadvantages: (a) inefficient use of DRAM (16 kB block occupies 16 kB worth of memory, when the only data in the block could be much less, e.g., 400 bytes), (b) inefficient use of 10 throughput (storage TOPS and 10 bandwidth), and (c) amplification of writes, e.g., a 400 byte change causes 16 kB write on flash memory, thereby resulting in more flash wear than necessary.

Thus, embodiments of the invention advantageously enable the size of data blocks in MySQL object store 132 to be configurable. For example, block sizes in MySQL object store 132 may be configured to be 4 k, 8 k, 16 k, 32 k, or 64 k. In this way, the block size may be optimized based on how MySQL object store 132 is used.

In an embodiment, a component within operating environment 120, such as caching component 122, may provide or expose an interface which enables a user, such as an administrator, to specify the block size for MySQL object store 132 (or any type of object store 130). Additionally, operating environment 120 may be configured to suggest a particular block size for MySQL object store 132 based on a how MySQL object store 132 has been used over a period of time. Certain embodiments may be configured to enable operating environment 120 to automatically adjust the block size for MySQL object store 132 based on how MySQL object store 132 has been used over a period of time. For example, if relatively small sized objects are being stored in MySQL object store 132, then caching component 122 may automatically adjust the block size of MySQL object store 132 from a 16 k block size to an 8 k block size.

Implementing the Double-Write Buffer in Non-Volatile Dram

As explained above, it is desirable to reduce the number of write operations issued to SSD(s) 310 to prolong their service life. In an embodiment, write operations issued to SSD(s) 310 are minimized by relocating double-write buffer(s) 332 from SSD(s) 310 to NV DRAM 326.

According to an embodiment of the invention, a configurable number of dirty blocks within write cache 328 storing data for object store 130, which are to be written to double-write buffer(s) 332, may be identified by object store 130. A dirty data block is a data block that has changes made to the data block which have not been persistently stored. Object store 130 may issue write operations to SSD access component 124 of operating environment 120, which in turn, may perform the write operations on one or more solid state devices, such as flash memory.

In response to SSD access component 124 receiving a request, from object store 130, to persistently store one or more dirty blocks stored in write cache 328 of SSD 310, object store 120 writes the one or more dirty blocks to double-write buffers 332 stored on NV RAM 326.

After object store 130 receives a message from NV DRAM 326 indicating that the required number of dirty blocks have been written to double-write buffers 332, object store 130 sends a message, to the entity that issued the request to persistently store the one or more dirty data blocks (which may be a client 50, such as client 50 (1)), which indicates that the one or more blocks have been persistently stored.

Thereafter, in an embodiment, a plurality of data blocks, within double-write buffer 332, that are to be written to one or more solid state devices 310 may be identified. The plurality of identified data blocks may then be written to one or more solid state devices 310 in a parallel operation and made persistent.

By implementing double-write buffer(s) 332 in NV DRAM 326, a number of advantages are realized. By moving double-write buffer(s) 332 from SSD(s) 310 to NV DRAM 326, the lifetime of SSD(s) 310 is prolonged if it is dependent upon wear. Write operations performed against SSD(s) 310 are slower than read operations, and so maintaining double-write buffer(s) in NV DRAM 326 enables write operations to a double-write buffer to be performed faster. Sequential write operations are faster than non-sequential write operations on a hard-disk drive. Therefore, sequential write operations to double-write buffer(s) 332 may be performed relatively fast, as a single large sequential write operation to double-write buffer(s) 332. Moreover, once data blocks are stored in double-write buffer(s) 332, double-write buffer(s) 332 may be scanned to intelligently batch data blocks written out of double-write buffer(s) 332 onto persistent storage on SSD(s) 310. For example, double-write buffer(s) 332 may be scanned to identify a set of contiguous data blocks, and those contiguous data blocks may be written out of double-write buffer(s) 332 to SDD(s) 310 to be persistently stored in parallel write operations.

Double-write buffer(s) 310 may be used to avoid "partial writes," where a portion of a write operation is performed against one flash memory but another portion of the same write operation is not performed against a different flash memory. Using double-write buffer(s) 332 on NV DRAM 326, if any part of a write operation is not successfully made to a persistent storage on SSD(s) 310 when block are written from double-write buffer(s) 332 to SSD(s) 310, then the write operation is not committed and corruption to the object store 130 may be avoided. Additionally during the initial stages of data recovery, storage blocks contained in double-write buffer(s) 332 may be reapplied to persistent data files to ensure SSD(s) 310 were not partially written to at the point of failure.

Supporting Highly Parallel Operations

In an embodiment where object store 130 corresponding to a database, it is desirable to flush out the database buffer pool for the database proactively and efficiently to provide space in the buffer pool for data that may not yet be stored in the buffer pool. One or more database buffer pools may be created in write cache 328 of SSD(s) 310. Embodiments of the invention may advantageously flush out a database buffer pool very efficiently and timely using multiple replacement algorithms in parallel. In this way, different regions of the database buffer pool may be replaced concurrently. To "replace" a portion of the buffer pool, clean data blocks are discarded and dirty data blocks are persistently stored, thereby freeing up space in the buffer pool for storing additional data blocks.

In an embodiment of the invention, flash memory is treated as an extension of dynamic RAM (DRAM). In order for embodiments to support the order of magnitude of transactional throughput involved in treating flash memory as an extension of DRAM, a high access rate to shared data-structures in the execution path is provided by scalability component 126 of operating environment 120. Shared data structures may include (a) a buffer pool lookup data-structure (which is used to lookup storage blocks maintained in the buffer pool by a key, where the key may be comprised of file-identification and a file offset), (b) a fast index lookup data-structure (a cache that maps database keys directly to leaf nodes of the B-tree, bypassing search of the branch nodes of the B-Tree), (c) a file descriptor table (which operates as a cache of open file descriptors to data files), and (d) a buffer pool replacement data-structure (which operates as an organization to efficiently maintain block reference locality and victims for eviction and write flush).

In an embodiment where object store 130 corresponds to a database, scalability component 126 ensures that a high rate of read operations against blocks that do not exist in a database buffer pool may be performed. Also, in embodiment, scalability component 126 ensures that a high rate of write operations may be performed when (a) the database buffer pool is configured as a write-through cache or (b) the database buffer pool is configured as a write-back cache and is required to service read misses that cause the eviction of dirty block (typically oldest blocks, or least frequently accessed, are evicted) or logging and check pointing that require flushing of pages in logical sequence number (LSN) order.

In embodiments, scalability component 126 may provide an efficient and parallel mechanism for searching for clean block victims to be replaced by a subsequent block read from storage. In an embodiment that employs a buffer pool with a write-back cache, scalability component 126 may search for dirty block victims to be replaced by a subsequent block read from storage in an efficient and parallel manner.

Over time, storage block sizes have been getting larger because of the increase in the number of input/outputs operations per second performed against hard-disk drives. However, random access and/or update workloads that involve a small portion of the storage block for a read operation or a write operation result in an inefficient use of storage and memory bandwidth when using a large block size. To substantially increase the number of input/outputs operations per second and to reduce the wear that occurs due to inefficient write operations to flash memory, smaller block sizes need may be utilized. To illustrate, embodiments of the invention may use smaller block sizes than prior approaches. Further, block sizes may be configurable in certain embodiments, e.g., block sizes may be 4k, 8k, 16k, 32k, and/or 64k in size.

It is observed that in prior approaches for implementing a database using flash memory wear out the flash memory due to inefficient write operations. Advantageously, embodiments of the invention address this concern by (a) hosting double-write buffer(s) 332 in NV DRAM 326 instead of flash memory, (b) hosting transaction log(s) 330 (which may be circular transactions logs) in NV DRAM 326 instead of flash memory, and/or (c) utilizing smaller storage block sizes.

Embodiments of the invention recognize that the performance of write operations is asymmetric to the performance of read operations in object stores maintained on solid state devices, such as flash memory. Write operations tend to be a small fraction of the read operations performed on object stores.

Efficient flash memory-based databases require flash-aware algorithms to balance write flushes from the buffer pool, perhaps according to the least recently used (LRU) block and/or log sequence number (LSN). If a few blocks are frequently updated, then SSD access component 124 may throttle down LSN based flushing to reduce excessive flushing of a frequent set of storage blocks. If random blocks are updated, then SSD access component 124 may utilize LRU-based flushing. If the difference in the latest LSN and the oldest LSN for a dirty block is approaching the log file size, then SSD access component 124 may utilize LSN-based flushing.

Flushing Using Threads in a Pipeline Fashion

Once victims for flushing are efficiently identified, a flash-based database requires highly parallel input/output (IO) mechanisms to flush at high rates while maintaining database consistency and durability. To achieve this, embodiments may employ pipeline-based flushing. Pipeline based flushing involves using a plurality of threads that operate differently according to which stage of a pipeline the thread is in.

To illustrate, in an embodiment, a plurality of threads are instantiated. Each instantiated thread is configured to perform work according to one of a plurality of stages. In an embodiment, the pipeline stages of flushing may include (a) copying a set of dirty storage blocks ("victims") in write cache 328 into a sequential DRAM buffer, (b) write the sequential DRAM buffer in one operation to a double-write buffer(s) 332 hosted in NV DRAM 326, (c) write the victims back to their locations in storage (which invariably will be random locations, and (d) flush write cache 328 (if write cache 328 is volatile on the back-end device) on each SSD 310.

In one embodiment, multiple double-write buffers are utilized to create a highly parallel and non-overlapping write process. Any number of instantiated threads may be in the same stage of the pipeline, e.g., the plurality of threads may include two or more threads that are operating in the same stage of the pipeline. Further, the plurality of threads may include any number of threads that are operating in different stages of the pipeline, e.g., at least two threads may be operating in different stages.

Synching the Write Cache of a SSD before Overwriting the data in Double-Write Buffer Certain solid state devices, including certain flash memories, maintain a volatile write cache. Data written to the solid state device is initially written to the volatile write cache. After some amount of time, the solid state device stores the data from the volatile write cache persistently on the solid state device. It may be uncertain as to when data is actually persistently stored on the solid state device; thus, it is difficult to determine with great precision exactly when data is actually persistently stored.

Embodiments of the invention ensure that before data in a double-write buffer is overwritten, the data to be overwritten is persistently stored. Advantageously, this guarantees that, even though the embodiment may be implemented in a replicated, distributed persistent data storage that employs one or more solid state devices, once data blocks are written to the double-write buffer, the data blocks are recoverable and an object store will be consistent upon recovery.

According to one approach, a first set of data blocks are written to volatile write cache 328 maintained on solid state device 310. A request to write a second set of data blocks to double-write buffer 332 maintained in a non-volatile dynamic random access memory (NV DRAM) 326 is received by a software module, such as scalability component 126. NV DRAM 326 may be implemented using a variety of different mechanisms, e.g., the NV DRAM may reside within hard-disk drive (HDD) controller 316.

In response to scalability component 126 receiving the request to write the second set of data blocks to double-write buffer 332, scalability component 126 ensures that any data blocks that are to be overwritten in the NV DRAM 326 as a result of writing the second set of data blocks to NV DRAM 326 are no longer present within the volatile write cache 328 maintained on the solid state device 310. The scalability component 126 may do so by communicating with one or more solid state devices 310 storing the data to be overwritten in the double-write buffer 332 to confirm that the entire contents of the volatile write cache 328 on the solid state device has been persistently stored. For example, scalability component 126 may issue an instruction, to the one or more solid state devices 310 that store data to be overwritten in the double-write buffer 332, to flush its write cache 328 to persistent storage. After scalability component 126 receives confirmation that each solid state device 310 storing data to be overwritten in double-write buffer 332 has persistently stored the contents of its write cache 328, scalability component 126 may conclude any data which is to be overwritten in double-write buffer 332 has been persistently stored, and may thereafter overwrite that data in double-write buffer 332.

Not Synchronizing Date in a Bad SSD in a Raid Configuration

In an embodiment, SSDs 310 may comprise a plurality of parallel SSDs that are configured to operate using RAID 5 (or any subsequent or similar version). This enables device 100 to tolerate the failure of a single SSD in SSD(s) 310 without a loss of service since the data can be read from the remaining SSDs. The use of a RAID algorithm minimizes the amount of flash space needed for redundancy and reduces hot spots. Because device 100 may be configured to be hot-swappable, a defective SSD in SSD(s) 310 may be replaced without interrupting the operation of object store 130. In addition, when a particular SSD fails, device 100 may issue an alert or notification to provide quick notification and guide remediation.

In an embodiment, if a particular solid state device in the RAID configuration becomes inoperable, then it would be advantageous to cease sending, to the inoperable SSD, instructions to flush its write cache. This is so because sending such an instruction to an inoperable SSD may cause the instruction to hang, thereby resulting in performance degradation in object store 130 or object store 130 entering an inoperable state.

An embodiment of the invention may address this issue by ceasing to send instructions to any SSD that is determined to have performance problems or be otherwise inoperable. To illustrate, consider an embodiment where a database resides on solid state devices 310 arranged in a redundant array of independent disks (RAID) configuration. SSD access component 124 may issue, to each SSD in SSDs 310, one or more requests to persistently store data blocks stored within volatile cache 328 maintained thereon. Using poll or event based notifications on the degraded state of the RAID configuration, upon SSD access component 124 determining that a particular SSD, of SSDs 310, is experiencing an operational problem, SSD access component 124 ceases to issue requests, to the particular solid state device experiencing an operational problem, to persistently store data blocks stored within volatile cache 328 maintained thereon. Advantageously, upon SSD access component 124 determining that the particular solid state device has overcome the operational problem (or the inoperable SSD has been replaced with a new, operational SSD), SSD access component 124 may resume the issuance of requests, to the particular solid state device, to persistently store data blocks stored within volatile write cache 328 maintained thereon.

Processing an Event in a MySQL Database on a SSD

In an embodiment where object store 130 comprises MySQL object store 132, a pool of threads may be used to process an event, such as a network based interrupt. To illustrate, initially, a plurality of threads is instantiated. Each of the instantiated threads is configured to retrieve items from a queue of items. Items are added to the queue of items by an event dispatcher, which is a software component responsible for adding item to the queue. Each item in the queue of items is associated with an event, such as a network based interrupt, occurring within a MySQL database management system.

When an instantiated thread retrieves an item from the queue of items, the thread processes the event associated with the item retrieved by the thread. If a particular event is related to another (for example, both events involve the same source), then it would be advantageous, in some circumstances, for the same thread to process both events. Thus, in an embodiment, there is a mechanism for ensuring that only a particular thread can dequeue an item from the queue if the item is related to a prior event that the particular thread processed.

The number of connections to the MySQL database management system has nothing to do with the number of threads in the plurality of threads. Thus, there can be more, the same, or less connections to the MySQL database management system than the number of threads in the system.

Achieving High Availability and Disaster Recovery

As discussed in greater detail below, embodiments of the invention support the creation of multiple virtual storage domains called "containers," which provide fine-grained control over cached resources. Containers provide isolation and policy control, yet efficiently share processing, DRAM, and flash resources. Containers can be configured in a variety of different modes, such as (a) eviction or store mode and (b) persistent or non-persistent mode. Replication of containers is supported by embodiments in all container modes.

Embodiments of the invention ensure high availability of device 100 in the event of either planned or unplanned downtime. A system may comprise of plurality of nodes that each are implemented using a device, such as device 100 of FIG. 1. Each node may be assigned a distinct virtual IP addresses. Two different nodes in the system, which may each be configured to support a Memcached/NoSQL environment, can be configured to operate as a mirrored pair in which data written (perhaps using a memcached set, put, replace, or cas operation) to one node is replicated to the other. If one node in the mirrored pair goes down, then the other node may transparently assume the virtual IP address assigned to the other and service its clients.

In an embodiment, write operations to be performed against a mirrored container may be sent to either node of the mirrored pair, assuming that each node in the mirrored pair maintains a copy of the mirrored container and changes are replicated between copies of the container. Although a write operation using may be sent to either node in the mirrored pair, this can result in inconsistent Memcaches (i.e., node 0 has different contents identified by a key than node 1 does for the same key). Thus, to maintain consistency, applications should map distinct key sets to each node in a mirrored pair.

In a system employing mirrored pairs, on each write to one node of the mirrored pair, operating environment 120 at that node may transparently replicate the write operation to the other node in the mirrored pair. Replication is done synchronously so that, when a client receives a positive acknowledgment that a write operation has been performed, the data is guaranteed to reside on both nodes of the mirrored pair.

When a failure of one of the nodes in the mirrored pair is detected by the other node (which may be detected via a heartbeat mechanism or when a messaging connection closes or times out), the surviving node assumes the virtual IP address of the failed node so that it can take over servicing requests for the failed node.

When a failed node, of a mirrored pair of nodes, comes back into service, the node initiates actions to become current. First, the recovering node notifies the surviving node that the recovering node is ready to recover. The surviving node then starts copying the necessary data to rebuild the recovering cache of the recovering node. The surviving node also starts replicating all new write operations to the recovering node. When the recovering node has finished re-populating its memcached data store, it takes ownership of its virtual IP address again and resumes service.

In an embodiment, replication in this fashion can also be used to perform a "rolling upgrade," in which the memcached application is updated to a newer version without a disruption in service. This is done by taking one node in a mirrored pair offline, upgrading it, and bringing it back online. When the upgraded node comes back online, the upgraded node goes through the recovery process with the surviving node, and then resumes service.

The SSDs in device 100 may be configured to operate using RAID 5, which further improves node availability. This allows the appliance to tolerate the failure of a single SSD without a loss of service. Since the SSDs may be hot-swappable in device 100, a defective SSD can also be replaced without stopping the memcached service. The use of RAID 5 algorithms minimizes the amount of flash space needed for redundancy.

Using Backup and Restore to Protect Against Data Corruption or Loss

Many users desire the ability to back up the contents of their memcached data store to assist in the recovery from user errors or application-driven data corruption for many reasons. Backing up contents of a memcached data store is advantageous for many reasons, including (a) full recovery and restore from catastrophic data loss, (b) warming the caches of new servers before bringing them online, and (c) logging.

In an embodiment where object store 130 of device 100 is a memcached object store 134, memcached object store 134 may support full and incremental backup and restore of persistent containers to on-board, high-capacity, hard disk drives and/or SSDs. A full backup is a logical copy of all objects in a container. An incremental backup is a logical copy of objects in a container that are new or have changed since the previous backup, including a logical representation of deleted objects. A full backup is taken to start a new backup "series," which contains the full backup plus zero or more incremental backups. There is no limit on the number of incremental backups in a series. Backups can be scheduled at regular intervals.

Backups can be taken while the server is still servicing client requests. In this case, data written by a client after the backup is started may or may not be included in the backup. Restoring a backup is the process of replaying backup streams to a server. A backup can be restored to any container. The target container must already exist and have sufficient space before the restore is started.

Using Containers for Data Distribution and to Manage Consolidation

In an embodiment where object store 130 of device 100 is a memcached object store 134, memcached object store 134 may support the creation of multiple virtual storage domains, called "containers," which provide fine-grained control over distributed cached and stored resources.

The control mechanisms for (a) data definition and operations, such as for defining access controls and resource constraints, (b) maintaining data consistency, (c) maintaining data availability as components of a data processing system fail, and (d) moving data to more optimal storage locations in the system, can impose a complexity and overhead cost on application programs and users of the application programs. For example, some systems which store and retrieve subscriber profile information may maintain a cache of recently-accessed profiles. Similarly, some systems may also store subscriber billing information. An application program which caches profile information may not desire to store cached profile information and billing information in the same way. Cached profile information may need to be quickly accessed but can be transient, as this data can be easily reconstructed if it is lost; consequently, this type of data may be kept in DRAM. On the other hand, billing information may need to be secure, highly available and permanent. Thus, billing information may be encrypted and stored with multiple copies in persistent memory across physically separate locations.

Many user application programs are written using various ad-hoc data management policies, such as in the prior example. Often, the data management policies of a particular application program must be written differently (changing the particular application program) when the particular application program is deployed on a different platform or system, further burdening the users and programmers of these systems. As a result, errors may be inadvertently introduced in the process of implementing data management policies in user software.

Advantageously, embodiments provide a mechanism, referred to herein as a "container," enabling one to specify the data management policies in the system, where a variety of data management policies may be implemented to support a range of application programs, in ways which are optimized for the system and optimized for the range of application programs.

Embodiments may employ containers to provide, to users and creators of application programs, control over data management policies. For example, some systems may provide a cache for data items and automatically manage the cache. Containers enable the user to be able to specify the amount of memory to be used for the cache, whether that amount is fixed or changing, what replacement policy to employ when the cache becomes full, and other behavioral controls.

Embodiments may employ containers to control particular data management policies for particular collections of data in the system. In the example above with the billing information and the profile information, one particular set of data management policies may be associated with the profile information, and a different set of data management policies may be associated with the billing information. Considering the caching in this example, containers advantageously enable the profile information to use a different amount of cache memory than the billing information, for example, to more optimally use memory for caching.

Further, embodiments may employ containers to provide users and application programmers a consistent Application Programming Interface (API) to control the data management policies of one or more collections of information. The API may be implemented using a declarative interface that provides a set of properties which are settable or changeable to define the desired data management policies. In the above example, the API may enable the cache size to be a customizable property that can be specified by the application programmer. Similarly, if the cache size is variable, then an upper size limit and a lower size limit can be optionally and/or selectively specified using additional properties via the API.

In an embodiment, different collections of data items may have different properties. Continuing the above example, the profile information may have a different set of cache properties than the billing information. Further in the example, a number of copies, or replicas, of data kept in a storage system may be a property of the billing information. A particular collection of data items with respective properties may have a consistent name space over time and across multiple nodes of a cluster, and regardless of the node location in the cluster containing the data items.

Embodiments may employ containers to enable a particular collection of data items to have associated default properties which are determined at a specified time (such as when the particular collection of data items are created), and which are able to be over-ridden at any time by property settings applied by application programs, system administrators, or users as data usage patterns change over time. In an embodiment, containers may be created and managed through operating environment 120. The TCP/IP addresses assigned to device 100 may be shared by all containers within device 100.

Each container may be configured to have a different set of attributes than other containers. To illustrate, each container may specify the ports at which the container accepts client requests, eviction policy employed by the container, the storage capacity of the container, and whether data stored in the container is persistent. Since each container may have a distinct port for accepting memcached requests, a container may behave like an independent instance of memcached caching system. However, since the processors, DRAM, flash and networking are all dynamically shared across containers, the result is a much more balanced and efficient use of resources than with multiple traditional memcached instances.

As previously mentioned, an attribute of a container may specify how the container handles persistence. In legacy memcached deployments, volatile DRAM is used to cache data. However, embodiments support the ability to make cached data durable. Cached data stored in a container specifying that data stored therein is persistently stored is available even after a power outage, thereby allowing memcached to instantly recover to its peak performance and avoid performance-degrading and multi-hour or multi-day cache warm-up periods. Another container attribute is store mode, which allows client-side applications to have control over the eviction of data from the container (or the cache is the container is implemented in a cache). In a container that is specified to operate in store mode, data will not be evicted without an application initiating the eviction.

Containers may implement security policies by using a mechanism such as access control lists. Containers can provide load balancing and support the incremental growth of additional nodes without the loss of service. Embodiments may enable container migration using the replication and fail-over mechanism or through container splitting and forwarding mechanisms, as shall be discussed in greater detail below.

Event Processing in a Memcached/NoSQL System

In an embodiment where object store 130 comprises memcached object store 134, a pool of threads may process events that occur in a memcached caching system that persistently stores data on one or more solid state devices. In an embodiment, a plurality of threads is instantiated. Each of the instantiated threads is configured to retrieve items from a queue of messages. Each message in the queue of messages is associated with an event occurring within the memcached caching system. Each event indicates an activity requiring work which has occurred within the memcached database management system. Items are added to the queue of items by an event dispatcher, which may be implemented using a software component.

When an instantiated thread retrieves an item from the queue of messages, the thread processes the event associated with the item retrieved by the thread.

If a particular event is related to another (for example, both events involve the same resource or originate from the same source), then it would be advantageous, in some circumstances, for the same thread to process both events. Thus, in an embodiment, there is a mechanism for ensuring that only a particular thread can dequeue a message from the queue that is related to a prior event the particular thread processed.

Containers and Slabs

A container is a logical grouping of objects that is independent from where the objects in the logical grouping are physically stored. A container may be exposed to a user such that the user is aware of its existence, the user may name the container, and the user may choose what data to store in the container. A container, in this context, serves a need similar to a physical container, in that it is a thing into which a user may put stuff (i.e., data).

A slab is an allocated amount of memory for storing objects of a particular size or a range of sizes. The notion of a slab need not be exposed to a user. The purpose of a slab is to ensure that digital data is stored efficiently on a solid state device. For example, one slab may be used to store relatively small objects in a certain size range, while another slab maybe used to store relatively large objects of a different size range. In an embodiment, a container may contain one or more slabs.

Containers may have a variety of different characteristics and operate in different modes. For example, a container may be configured to operate in store mode or in cache mode. When a container is operating in store mode, objects stored in the container cannot be eviction unless the container receives an explicit request to do so. When a container is operating in cache mode, the container may use one or more of a variety of different object replacement algorithms to determine which objects stored in the cache should be evicted to make room for newer objects to be stored in the cache.

A container may also be configured to operate as either a write-back or write-through cache. In a write-through cache, a transaction is not committed until the data written by the transaction is persistently stored. In a write-back cache, a transaction may be committed by persistently storing a transaction log which describes the transaction, so that in the case of a failure, the changes made by the transaction may be reapplied to the database to bring the database current.

Additionally, a container may be assigned a minimum level of access rights or security privileges which must be presented to access the contents of the container.

To illustrate how containers may be employed, consider the following example. In an embodiment, when a solid state device receives a write operation, the solid state device determines how to persistently store changes requested by the write operation based on which container the write operation is to be performed against. The container may be configured by a user to operate according to a plurality of modes. For example, the modes may include: (a) a first mode where an object stored in the container is not evicted from the container until an explicit request to evict the object is received (store mode), and (b) a second mode wherein an object stored in the container may be evicted from the container to make room for another object (cache mode). As another example, the modes may include: (a) a first mode wherein an object stored in the container is persistently stored, and (b) a second mode wherein an object stored in the container is not persistently stored.

In an embodiment, a container may have a hierarchical relationship with another container. In this way, the child container may inherit all the properties or attributes that are assigned to a parent container. Advantageously, if one container needs to split or divide into multiple containers (for example, for load balancing or growth purposes), any new container may be considered a child container of the previously existing container (or "parent" container), and inherit all of the attributes or properties assigned to the parent container. For example, it may be necessary to split or divide a container into multiple containers if the amount of data stored within the container is approaching a specified threshold of the total capacity of the container or if the container is experiencing performance issues. In these examples, a parent container may be automatically split or divided into two or more containers, and the new child containers may be located on different physical nodes. The physical location of any new child containers may be specified using a variety of different mechanisms, e.g., the physical location of new child containers may be determined by a policy or by attributes or properties associated with the parent container.

Write Additional Data to Fill the Slab to Increase Performance

The inventors have discovered that, due to some idiosyncrasy of modern solid state devices, such as flash memory, it is actually possible to obtain better performance in writing data, in some circumstances, by writing more data than is desired. While this may appear to be counterintuitive, the inventors believe that flash memory may have some inherent features that enable it to write a larger amount of data more efficiently than a smaller amount of data.

The inventors have implemented this counterintuitive observation in the following embodiment. In an embodiment, a cache is maintained on a solid state device. The cache comprises two or more slabs. Each of the one or more slabs is an allocated amount of memory for storing objects of a particular size or a range of sizes. A request to write requested data to a particular slab is received by the solid state device. The size of the requested data is less than the size of the particular slab. After writing the requested data to the particular slab, the solid state device writes, to the remainder of the slab, unrequested data to the particular slab in the same write operation in which the requested data was written. The contents of the unrequested data are not particularly important and need not be meaningful data. However, the act of writing data to the full length of the slab (i.e., writing the requested and the unrequested data) will result in a faster write operation than if only the requested data were written (i.e., without writing the unrequested data).

Reserving Space Before Writing to Cache

Certain solid state devices, such as some flash memories, use a volatile write cache to store data blocks prior to persistently writing the data blocks to the solid state device. As a result, determining exactly when data written to a solid state device is persistently stored can be tricky. In a distributed, replicated storage system, solid state devices receive a large number of write transactions, and it is helpful to determine exactly when data is persistently stored for purposes of ensuring the storage system is recoverable and consistent. Further, it is helpful to ensure that no problems or complications will be encountered when data is written out of the volatile write cache to persistently storage on the solid state device. For example, if the solid state device does not have enough room to store all the data in the volatile write cache, then performance problems may develop and data atomicity, consistency, and durability obligations may not be met. Thus, embodiments of the invention advantageously reserve space on the solid state device for persistently storing data before the data is written to the volatile write cache of the solid state device. In this way, the solid state device is ensured to have enough space to store all volatile data in its volatile write cache, thereby minimizing the likelihood that problems with persistently storing data in the volatile write cache of a solid state device will occur.

To illustrate how an approach may work, embodiments of the invention may maintain a volatile cache on one or more solid state devices. The solid state device, or a software module residing thereon, receives a request to write data to the volatile cache of the solid state device. Prior to writing the data to the volatile cache, a software module (the "space reserving module") reserves space, on the solid state device, to persistently store the data requested to be written to the volatile write cache of the solid state device.

The space to persistently store data on a solid state device may be reserved in a variety of different manners. In an embodiment, the space reserving module residing on a solid state device reserves enough space on the solid state device to persistently store just the data requested to be written to the volatile write cache of the solid state device. In another embodiment, the space reserving module residing on a solid state device reserves enough space on the solid state device to persistently store the entire contents of the volatile cache. In another embodiment, in response to the space reserving module being unable to reserve space on a first solid state device on which the space reserving module resides, the software module may reserve space on a second solid state device, different than the first solid state device, in which to persistently store the data maintained in the volatile write cache of the first solid state device.

In an embodiment, if the space reserving module is unable to reserve space, the space reserving module may send a message to an interested party, such as the software entity issuing the write operation of the solid state device, that indicates that the data is not guaranteed to be persistently stored due to an inability to reserve space on the solid state device.

Replicating Cache of one Node to Another/Containers

Advantageously, embodiments of the invention provide for the efficient and expedient replication of the volatile cache of one solid state device into the volatile cache of another solid state device. According to one approach, objects stored in the volatile cache maintained at each solid state device of a plurality of solid state devices are replicated to all other volatile caches maintained at other solid state devices of the plurality of solid state devices. At a particular solid state device of the plurality of solid state devices, a determination is made as to how to perform a write operation that has been replicated from another solid state device, of the plurality of solid state devices, to the particular solid state device based on which container, at the particular solid state device, the replicated write operation is to write. The cache of one SSD may be transferred using the bulk transfer techniques discussed below.

Transparent Failover

When a node of a cluster becomes operational, it is desirable for another node to take over for the failed node in a manner transparent to users of the cluster. Embodiments of the invention employ an approach where nodes of a cluster can detect when other nodes of the cluster become inoperable, and subsequently take over for the failed node by claimed the virtual IP address of the failed node.

To illustrate, consider a cluster of nodes which replicate data to each other. Each node in the cluster comprises one or more solid state devices. When a first node in the cluster detects that a second node is inaccessible over a network, the first node (a) may assume a virtual internet protocol address of the second node and (b) service requests addressed to the virtual internet protocol address. For example, the first node may detect the second node is inoperable because a communication (including but not limited to a heartbeat message) have not been received from the second node in a configurable amount of time or the first node may detect a socket closure on the second node. Because requests are sent to the virtual IP address, the first node will be able to receive and service requests formerly received and processed by the second node. Naturally, when the second node becomes operational again, the second node may reclaim its former virtual IP address, or be assigned to a new virtual IP address, to resume receiving and processing requests.

Bulk Transfer

When recovering data from one node to another node, it is desirable to do so in the most expedient manner possible so that the recovering node may become operational in the shortest amount of time. Embodiments of the invention employ a technique where data may be read in bulk from one node, transferred in bulk to a second node, and written in bulk to a third node. This bulk transfer of data is useful in many contexts, but it has particular utility when the node receiving the data is a recovering node, because the recovering node may populate its volatile cache in this manner in a fast and efficient manner.

In an embodiment of the invention, a first solid state device, reads, from a contiguous location, a container of objects. The first solid state device may read the container of objects in a single read operation (or as few operations as possible). Thereafter, the first node may send the container of objects to a second solid state device. Preferably, the container of objects will be sent to the second solid state device in a single operation. The second solid state device may then write, to a contiguous location, the container of objects. Again, preferably the second solid state device will write the container of objects in a single operation. When the first solid state device reads the container of objects, the objects within the container may be identified by using knowledge about how the objects are laid out in the disk.

Batching Write Operations in Flight

In an embodiment, a first node, maintains in memory, a set of write operations to be performed on a second node. Each of the first node and the second node persistently store data using one or more solid state devices, and the first node and the second node are both part of a distributed data storage system which uses flash memory to persistently store data.

The first node examines the list of write operations maintained in memory to identify a set of related write operations that write to contiguous data blocks. Then, the first node sends a single write operation to the second node to request the performance of the set of related write operations on the contiguous data blocks at the second node. In this way, rather than the first node sending a large number of small write operations to the second node, the first node may send one larger write operation that writes to contiguous data blocks.

Dynamic Scaling

Dynamic scaling, or "auto-sharding," is the process of physically relocating a portion of the objects in an existing container to a new container at a new location to increase the number of clients that can be supported (by increasing the overall transaction rate to that container). Auto-sharding may be performed N-ways; however, for purposes of providing a clear example, the techniques of auto-sharding will be discussed below in terms of a 2 way split, although the below teaching may be generalized to handle performing auto-sharding N-ways.

In an embodiment, initially the location of the new container and any replicas thereof are identified. The location may be on one or more new physical servers or one or more existing physical servers or any combination thereof.

Once the location of the new container and any replicas are identified, on one existing node with a copy of the container to be "auto-sharded," keys to access objects in the container are split into 2 disjoint sets, referred to herein as set A and set B (to generalize this approach to accommodate a N-way split, the keys of the container would be split N ways). The keys of set A are intended to remain with in the existing container while the keys of set B are intended to be migrated to the new container at the new location(s). A copy of the keys for set B and their associated objects are copied to the new container and all new replicas of the new container. Advantageously, fast bulk and incremental recovery algorithms discussed herein may be used to perform this function. Contemporaneous with this activity, client requests involving the keys of both set A and set B may continue to be serviced by the existing container.

Once the new containers/replicas are up-to-date, they will begin servicing requests involving keys in set B while the existing node continues to service requests involving keys of set A. This transfer may take place transparently by enabling/transferring virtual IP addresses, similar to how failover and recovery is handled. The existing node and all of its replicas must now discard all copies of the keys in set B, and refuse requests involving keys of set B.

The assignment and dissemination of IP addresses for the new containers (or new "shards") can be done in multiple ways. According to a first example for assigning and disseminating IP addresses for new containers, servers having containers to be split are made aware of the new IP addresses for sets A and B at the time sharding is initiated. Once these servers stop servicing key set B, they can return an error code and the new IP addresses to any client that tries to access set B at the old server. The client can then update its key map so that all future accesses involving the keys of set B are sent to the correct (new) server.

According to a second example for assigning and disseminating IP addresses for new containers, before the process of auto-sharding is started, all existing nodes servicing a container activate the new IP-addresses so they can service key in sets A and B using the old or new IP addresses. At this point, clients can all update their key maps. When the sharding is complete, the servers just transfer virtual IP addresses in a manner similar to what is done for a failover. This communication algorithm has less impact on the clients.

According to a third example for assigning and disseminating IP addresses for new containers, servers can be configured to forward requests to the correct server, and return the response. This has no impact on existing clients, but reduces performance by introducing extra processing and network traffic.

Moreover, the dynamic splitting of a container is avoided may be avoided by pre-splitting containers when they are created. In other words, instead of creating a single container on a physical node that holds key sets A, B, C, and D, a container may be "pre-split" into 4 separate smaller containers (or "sub-containers"), each holding key set A, B, C and D respectively. When the container comprises the four smaller sub-containers needs to be auto-sharded to one or more physical servers to increase throughput, one or more of the sub-containers may be copied to the new replicas. This approach avoids the splitting step in the algorithm above. Of course, with this variation, there is a limit to the number of nodes to which the container can be distributed (which is equal to the number of sub-containers in the container).

Improved Mechanisms for Recovery

A prior approach for performing replication for nodes of a cluster involves assigning, to each node in the cluster, a pair of nodes which contain replicas of its entire contents. This has the side effect of causing a 100% load increase on failures. Further, the approach also allows no parallelism when nodes are replaced, thereby prolonging recovery if an existing load must be supported and causing suboptimal reliability which is inversely proportional to the mean time of recovery.

A statistically uniform shard replica distribution scheme avoids both problems by tending towards uniform load increase across the surviving nodes during a failover, thus minimizing the required cluster size and the cost to handle the increase and allowing for parallel replica recreation following a failure.

In an embodiment, a key space is divided into a number of equal sized segments greater than the expected number of nodes in the cluster. Typically, the key space is the range of values returned by a hash function applied to larger set of user-visible keys.

Each node in the cluster is assigned a number of tokens in this key space, often pseudo-random or random in nature. N replicas of objects in a key space segment are stored in the nodes assigned the next N suitable tokens, wrapping around from the highest value of the key space to the lowest. "Suitable" tokens are defined as belonging to nodes that will limit common failure domains; such as on different nodes, in different racks, and/or in different data centers. Since the tokens tend towards uniformly mixed ordering, nodes tend to shed load relatively evenly during failures, e.g., a six node cluster would tend towards a 20% load increase on each remaining node during a failure.

Recovery can be done in parallel from all the nodes instead of a single node in the naive approach, thus allowing it to complete faster for a given performance impact for better reliability.

Incremental Recovery

Some replicated systems discard the entire replica contents prior to performing a full copy for recovery. This simplifies dealing with deleted objects but makes reliability poor because it is inversely proportional to mean time to recovery and recovery time is a function of total data size and not outage length.

Advantageously, embodiments employing replicated systems may recover incrementally. Some embodiments use a separate log of all modifications performed on the system, which improves recovery time but comes at the expense of doubling write traffic to stable storage with writes duplicated into both log and primary storage. Some embodiments look at the differences between replicas but this can have high implementation and execution costs.

Embodiments assign monotonically increasing sequence numbers to modifications, such as write key+object+meta-data including sequence numbers, to its permanent location, and log tombstones separately.

On failure or recovery progress, the ranges of data which have been synchronized, are in need of resynchronization, or may have write operations not yet performed against other replicas and needing roll-back are stored separately. For containers implementing single copy semantics (where the system has the same observable read and write behavior as a non-replicated system) replica state (authoritative and could serve reads with switch-over allowed; or non-authoritative without current data) is stored. One embodiment stores this shard level meta-data using a store implemented as a distributed state machine using the well known Paxos family of protocols.

The recovery process iterates objects and tombstones intersecting the roll-back ranges in an efficient order and performs compensating undo actions in all replicas. Objects yet to be replicated are replayed in an efficient order (such as by physical address in stable storage). Opaque cursors describing iteration progress are periodically stored in the shard-level meta-data so that recovery can resume approximately where it left off following a subsequent failure. On completion shards with single-copy semantics have their recovered replicas updated to the authoritative state.

The oldest retained tombstone sequence number is tracked along with space remaining for tombstones. When space becomes too low to store tombstones which have not been forwarded to an off-line replica a long full recovery will be required. Before this happens the system may proactively create a new replica to maintain reliability.

Implementing Mechanisms

Figure 4:
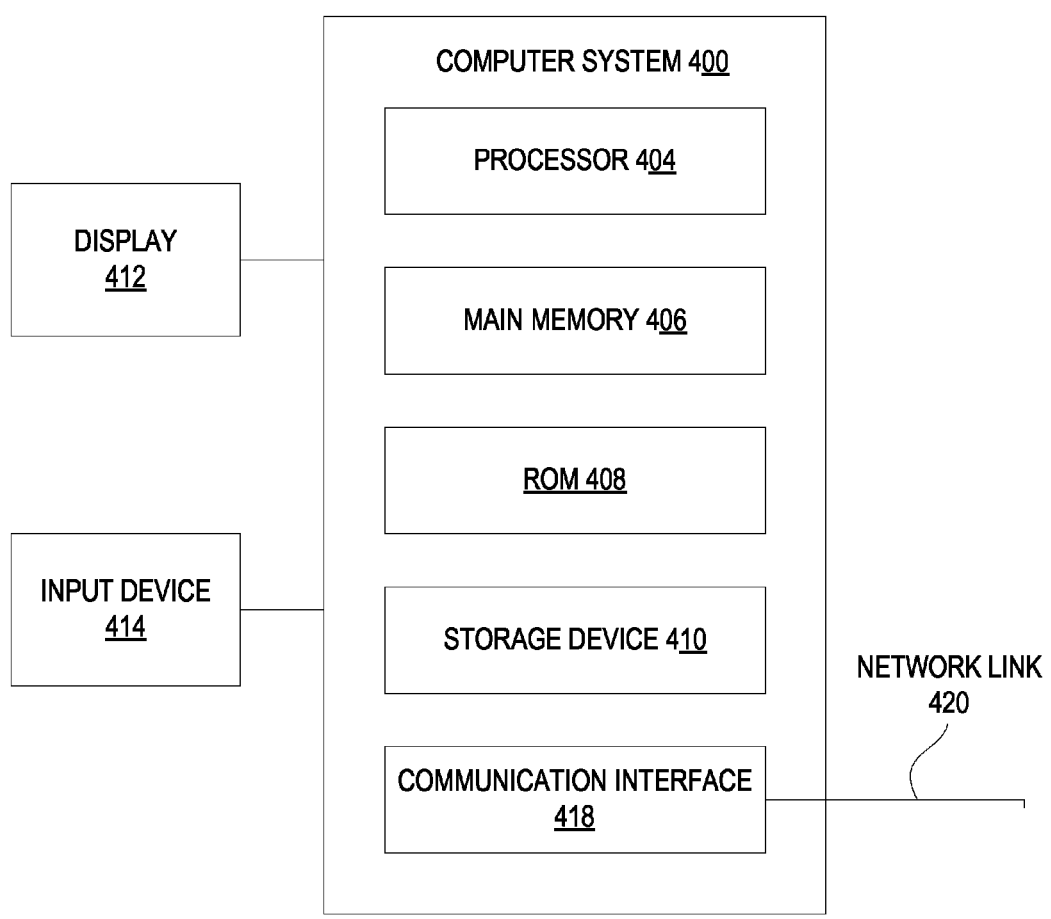
FIG. 4 is a block diagram that illustrates a computer system upon which an embodiment of the invention may be implemented.

In an embodiment, device 100 may be implemented on or using a computer system. FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any medium that participates in storing instructions which may be provided to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for performing a write operation on a solid state device, comprising:
   maintaining one or more containers at the solid state device, wherein each container, of the one or more containers, is a logical grouping of objects independent from where the logical grouping of objects are physically stored on the solid state device; and
   upon receiving, at the solid state device, the write operation, determining how to store changes requested by the write operation based on which container, of the one or more containers, is associated with an object to which the write operation is to write.

2. The method of claim 1, wherein each container, of the one or more containers, may be configured by a user to operate according to a plurality of modes, and wherein the plurality of modes includes:
   a first mode wherein an object stored in the container is not evicted from the container until an explicit request to evict the object is received, and
   a second mode wherein an object stored in the container is eligible to be evicted from the container to make room for another object.

3. The method of claim 1, wherein each container, of the one or more containers, may be configured by a user to operate according to a plurality of modes, and wherein the plurality of modes includes:
   a first mode wherein an object stored in the container is persistently stored, and
   a second mode wherein an object stored in the container is not persistently stored.

4. The method of claim 1, wherein each container, of the one or more containers, may be configured by a user to operate according to a plurality of modes, and wherein the plurality of modes includes:
   a first mode wherein access to an object stored within the container requires a first set of access privileges; and
   a second mode wherein access to an object stored within the container requires a different set of access privileges than the first set of access privileges.

5. The method of claim 1, further comprising:
   upon determining that a particular container, of the one or more containers, is experiencing a workload that exceeds a specified threshold, (a) dividing a set of keys used to access objects in the particular container into two or more groups of keys, and (b) creating a new container to store objects associated with a group of keys in the two or more groups of keys.

6. The method of claim 1, wherein a particular container, of the one or more containers maintained at the solid state device, comprises two or more sub-containers that are each associated with a set of keys that identify objects stored within the particular container, and wherein the two or more sub-containers may be used to migrate, at a later point in time, a portion of the objects to a different physical location.

7. The method of claim 1, wherein a child container, of the one or more containers maintained at the solid state device, is in a hierarchical relationship with a parent container of the one or more containers maintained at the solid state device, and wherein the child container inherits all the properties assigned to the parent container.

8. The method of claim 1, wherein determining how to store changes requested by the write operation comprises determining one or more attributes or mode settings of the container associated with the object.

9. A method for maintaining a replicated object store maintained on a plurality of solid state devices, comprising:
   replicating objects stored in a volatile cache maintained at each solid state device of the plurality of solid state devices to all other volatile caches maintained at the other solid state devices of the plurality of solid state devices; and
   at a particular solid state device of the plurality of solid state devices, determining how to perform a write operation that has been replicated from another solid state device, of the plurality of solid state devices, based on a container, at the particular solid state device, the replicated write operation is to write,
   wherein the container is a logical grouping of objects that is independent from where the logical grouping of objects are physically stored.

10. The method of claim 9, further comprising:
    at the particular solid state device, determining how to replicate a different write operation to another solid state device, of the plurality of solid state devices, based on a different container, at the particular solid state device, upon which the different write operation was performed.

11. A device comprising:
    one or more solid state devices;
    one or more processors; and
    memory storing one or more programs, which when executed by the one or more processors, cause the device to perform a method comprising:
       maintaining one or more containers at a solid state device of the one or more solid state devices, wherein each container, of the one or more containers, is a logical grouping of objects independent from where the logical grouping of objects are physically stored on the solid state device; and
       upon receiving, at the solid state device, a write operation, determining how to store changes requested by the write operation based on which container, of the one or more containers, is associated with an object to which the write operation is to write.

12. The device of claim 11, wherein each container, of the one or more containers, may be configured by a user to operate according to a plurality of modes, and wherein the plurality of modes includes:
- a first mode wherein an object stored in the container is not evicted from the container until an explicit request to evict the object is received, and
- a second mode wherein an object stored in the container is eligible to be evicted from the container to make room for another object.

13. The device of claim 11, wherein each container, of the one or more containers, may be configured by a user to operate according to a plurality of modes, and wherein the plurality of modes includes:
- a first mode wherein an object stored in the container is persistently stored, and
- a second mode wherein an object stored in the container is not persistently stored.

14. The device of claim 11, wherein each container, of the one or more containers, may be configured by a user to operate according to a plurality of modes, and wherein the plurality of modes includes:
- a first mode wherein access to an object stored within the container requires a first set of access privileges; and
- a second mode wherein access to an object stored within the container requires a different set of access privileges than the first set of access privileges.

15. The device of claim 11, wherein execution of the one or more programs by the one or more processors further causes:
- upon determining that a particular container, of the one or more containers, is experiencing a workload that exceeds a specified threshold, (a) dividing a set of keys used to access objects in the particular container into two or more groups of keys, and (b) creating a new container to store objects associated with a group of keys in the two or more groups of keys.

16. The device of claim 11, wherein a particular container, of the one or more containers maintained at the solid state device, comprises two or more sub-containers that are each associated with a set of keys that identify objects stored within the particular container, and wherein the two or more sub-containers may be used to migrate, at a later point in time, a portion of the objects to a different physical location.

17. The device of claim 11, wherein a child container, of the one or more containers maintained at the solid state device, is in a hierarchical relationship with a parent container of the one or more containers maintained at the solid state device, and wherein the child container inherits all the properties assigned to the parent container.

18. The device of claim 11, wherein determining how to store changes requested by the write operation comprises determining one or more attributes or mode settings of the container associated with the object.

19. A device comprising:
- a plurality of solid state devices;
- one or more processors; and
- memory storing one or more programs, which when executed by the one or more processors, cause the device to perform a method comprising:
  - replicating objects stored in a volatile cache maintained at each solid state device of the plurality of solid state devices to all other volatile caches maintained at the other solid state devices of the plurality of solid state devices; and
  - at a particular solid state device of the plurality of solid state devices, determining how to perform a write operation that has been replicated from another solid state device, of the plurality of solid state devices, based on a container, at the particular solid state device, the replicated write operation is to write,
  - wherein the container is a logical grouping of objects that is independent from where the logical grouping of objects are physically stored.

20. The device of claim 19, wherein execution of the one or more programs further causes:
- at the particular solid state device, determining how to replicate a different write operation to another solid state device, of the plurality of solid state devices, based on a different container, at the particular solid state device, upon which the different write operation was performed.

\* \* \* \* \*